United States Patent

Mori et al.

[11] Patent Number: 5,962,577
[45] Date of Patent: *Oct. 5, 1999

[54] AQUEOUS RESIN COMPOSITION FOR COATING METAL, AND RADICALLY POLYMERIZABLE MACROMONOMER

[75] Inventors: Yoshio Mori; Shiro Kojima, both of Aichi, Japan

[73] Assignee: Toagosei Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/819,034

[22] Filed: Mar. 17, 1997

[51] Int. Cl.$^6$ ...................................... C08L 61/00
[52] U.S. Cl. .................... 524/512; 524/504; 526/208; 526/209; 526/211; 526/214; 526/224; 526/304
[58] Field of Search ...................... 526/304, 208, 526/209, 211, 214, 224; 524/504, 512

[56] References Cited

U.S. PATENT DOCUMENTS

| | | | |
|---|---|---|---|
| 3,585,063 | 6/1971 | Remmington | 428/483 |
| 3,860,563 | 1/1975 | Katsimbas et al. | 526/304 X |
| 4,282,343 | 8/1981 | Platt, Jr. | 526/304 X |
| 4,330,640 | 5/1982 | Buchwalter | 526/304 X |
| 4,358,355 | 11/1982 | Kalu et al. | 526/304 X |
| 4,529,558 | 7/1985 | Melchior | 526/304 X |
| 4,562,008 | 12/1985 | Markle et al. | 526/304 X |
| 5,162,582 | 11/1992 | Ito et al. | 526/304 X |
| 5,290,602 | 3/1994 | Argyropoulos et al. | 526/320 |

FOREIGN PATENT DOCUMENTS 50235  4/1982  European Pat. Off. .

*Primary Examiner*—Judy M. Reddick
*Attorney, Agent, or Firm*—Sughrue, Mion, Zinn, Macpeak & Seas, PLLC

[57] ABSTRACT

An aqueous resin composition for coating a metal, which can form a coating film having excellent water resistance and also having high hardness and excellent workability even after being subjected to a pressurized steam treatment is provided. The aqueous resin composition comprises (A) an aqueous copolymer obtained by neutralizing with a base carboxyl groups in a copolymer which is obtained by copolymerizing (a) a macromonomer which is a copolymer of N-alkoxymethyl (meth)acrylamide monomer units and other α,β-ethylenically unsaturated monomer units, having a radically polymerizable group at one end thereof, (b) α,β-ethylenically unsaturated carboxylic acid, (c) hydroxyalkyl (meth)acrylate, and (d) other α,β-ethylenically unsaturated monomers, in specific proportions, and (B) an amino resin.

6 Claims, 2 Drawing Sheets

AQUEOUS RESIN COMPOSITION FOR COATING METAL, AND RADICALLY POLYMERIZABLE MACROMONOMER

FIELD OF THE INVENTION

The present invention relates to an aqueous resin composition for coating a metal, and a novel radically polymerizable macromonomer. The aqueous resin composition for coating a metal according to the present invention has excellent water resistance, particularly steam resistance, and forms a coating film having high hardness and excellent workability even after treatment with a pressurized steam. Therefore, the aqueous resin composition is particularly useful as an aqueous paint for a steel plate used in metal cans, household appliances, automobiles, and the like. The macromonomer can be used as raw materials for graft copolymers that are used in paints, adhesives, pressure-sensitive adhesives, forming materials, and the like.

BACKGROUND OF THE INVENTION

Physical properties of water resistance, workability and the like at high temperature are required for a paint for metal, particularly paints for coating metal cans used for packing of refreshing beverage, processed foods, and the like. Organic solvent type paints such as epoxy/amino resins, acrylic/amino resins, polyester/amino resins, and the like which form excellent coating film by heat curing have conventionally been used as such paints for coating metals. However, in those solvent type paints, a large amount of organic solvents volitilizes in atmosphere in coating them, causing the problems of environmental pollution, consumption of resourses, and the like.

In view of the above, it is considered to use an aqueous paint using water as a medium in place of the solvent type paints. However, the conventional aqueous paints have poor water resistance. Further, although the conventional aqueous paints are durable to hot water treatment of, for example, boiling water, if those are subjected to a treatment with a pressurized steam of 120° C. or more (retort treatment), physical properties of the coating film thereof markedly deteriorate. Thus, the conventional aqueous paints cannot practically be used.

There are various proposals regarding aqueous paints which are durable to the pressurized steam treatment. For example, JP-A-3-72577 (The term "JP-A" used herein means an "unexamined published Japanese patent application) proposes an aqueous paint comprising (a) an aqueous acrylic resin obtained by neutralizing a copolymer having carboxyl group of the molecule, comprising an aromatic vinyl monomer and an alkyl (meth)acrylate as the main components, with a base, (b) a hydroxyl-containing polyol, and (c) an amino resin. However, the physical properties of the coating film obtained do not still reach to a practically satisfied level.

JP-A-6-65535 proposes an aqueous paint which comprises a macromonomer which is a polymer of (meth)acrylic acid alkyl ester monomers and/or styrene monomer units, as the main components, having a radically polymerizable group at one end thereof, and other copolymerizable monomer. However, the physical properties of the coating film thereof after a severe treatment of a retort treatment are not yet satisfactory.

SUMMARY OF THE INVENTION

As a result of various investigations to overcome the above-described problems involved in the prior art, it has been found that an aqueous resin composition comprising an aqueous copolymer obtained from a radically polymerizable macromonomer comprising an N-alkoxymethyl (meth)acrylamide monomer unit as one structural component of its polymer portion, and other radically polymerizable monomers, and an amino resin can give a coating film having excellent water resistance, and also excellent hardness and workability even after retort treatment at 120° C. or more.

It has also been found that a macromonomer which is a polymer of a self-crosslinkable N-alkoxymethyl (meth)acrylamide monomer unit as structural unit can provide, when copolymerized with other radically polymerizable monomers, a graft copolymer having a easily crosslinkable branch, which is suitably used in paints or adhesives as a novel material.

The present invention has been completed based on those findings.

Accordingly, one object of the present invention is to provide an aqueous resin composition for coating a metal, which gives a coating film having excellent various properties.

Another object of the present invention is to provide a radically polymerizable macromonomer.

The aqueous resin composition for coating a metal according to the present invention comprises (A) an aqueous copolymer obtained by neutralizing with a base carboxyl groups in a copolymer which is obtained by copolymerizing
   (a) 3 to 30% by weight of a macromonomer which is a copolymer of an N-alkoxymethyl (meth)acrylamide monomer unit and other $\alpha,\beta$-ethylenically unsaturated monomer units, having a radically polymerizable group at one end thereof;
   (b) 3 to 20% by weight of an $\alpha,\beta$-ethylenically unsaturated carboxylic acid;
   (c) 5 to 40% by weight of a hydroxyalkyl (meth) acrylate; and
   (d) 10 to 89% by weight of other $\alpha,\beta$-ethylenically unsaturated monomers,
the amount of the components (a) to (d) being based on the total weight of the components (a) to (d), and (B) an amino resin.

The aqueous resin composition for coating a metal according to the present invention is preferably used for coating a metal can.

The radically polymerizable macromonomer according to the present invention is a vinyl polymer containing an N-alkoxymethyl (meth)acrylamide monomer unit as-an indispensable component of its polymer skeleton, having a radically polymerizable group at one end thereof, the macromonomer having a number average molecular weight of 1,000 to 30,000.

DETAILED DESCRIPTION OF THE INVENTION

Figure 1:
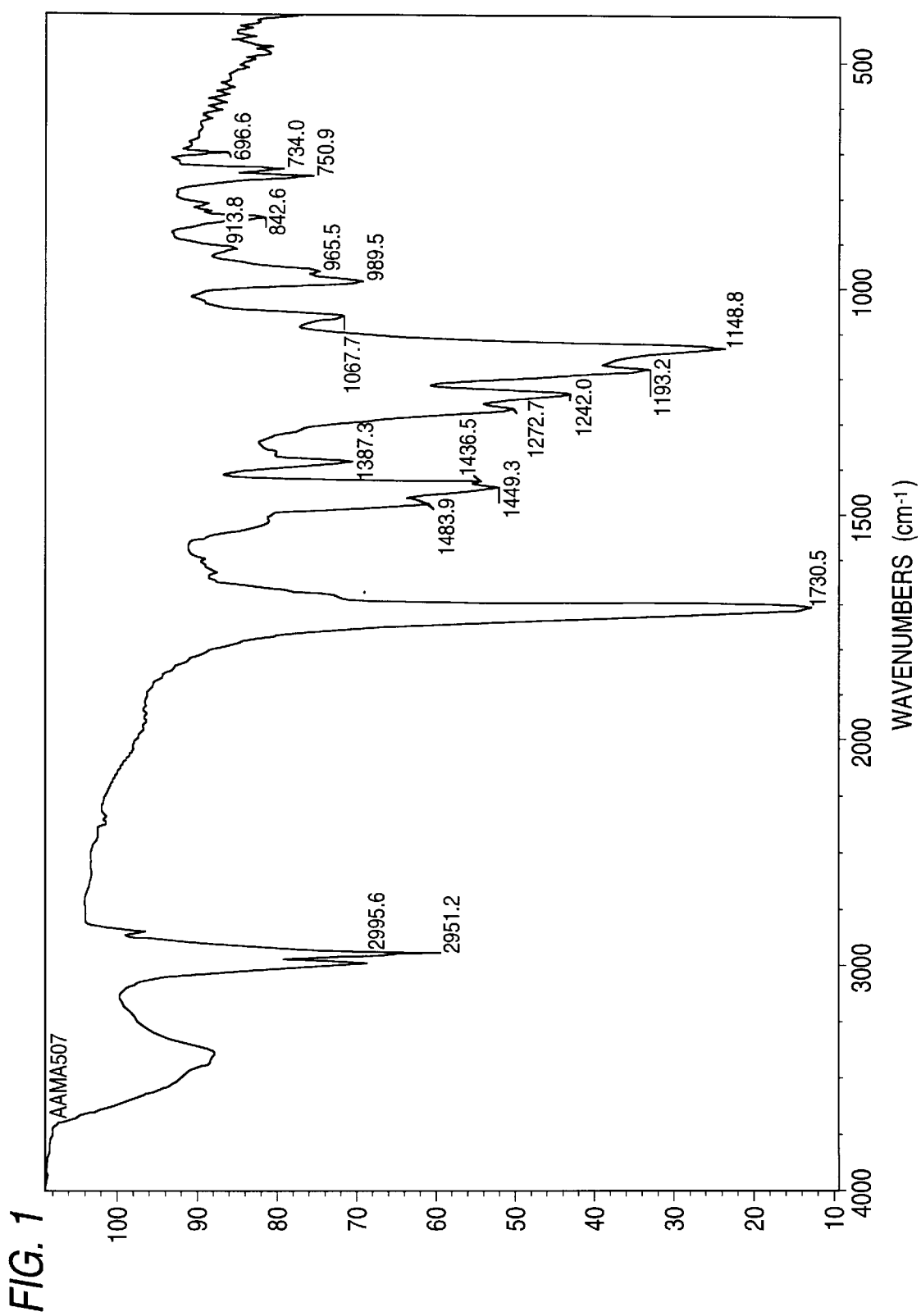
FIG. 1 shows an infrared absorption spectrum of the macromonomer obtained in Production Example 4.

The present invention is described in detail below.

The copolymer (A) prior to neutralization with a base is a graft copolymer comprising the macromonomer (a) as a branch, and other components (b) to (d) as a backbone. This copolymer is hereinafter referred to as an "unneutralized graft copolymer".

The macromonomer (a) in the present invention, which is also one object of the present invention, is a homopolymer of an N-alkoxymethyl (meth)acrylamide unit alone or a copolymer of the N-alkoxymethyl (meth)acrylamide unit and other α,β-ethylenically unsaturated monomer units, having a radically polymerizable group at one end thereof.

Examples of the N-alkoxymethyl (meth)acrylamide include N-methoxymethyl (meth)acrylamide, N-butoxymethyl (meth)acrylamide and N-isobutoxymethyl (meth)acrylamide. Of those, N-methoxymethyl (meth) acrylamide is preferred from the standpoints of having high crosslinkability and hydrophilicity.

Examples of the other α,β-ethylenically unsaturated monomer (hereinafter referred to as a "comonomer") which forms a polymer skeleton of the macromonomer together with the N-alkoxymethyl (meth)acrylamide include (meth) acrylic acid alkyl esters such as methyl (meth)acrylate, ethyl (meth)acrylate, butyl (meth)acrylate, 2-ethylhexyl (meth) acrylate or cyclohexyl (meth)acrylate; styrene derivatives such as styrene, α-methyl-styrene or p-methylstyrene; nitrile-containing vinyl monomers such as (meth) acrylonitrile; acrylic acid alkylaminoesters; stearyl (meth) acrylate; and lauryl (meth)acrylate. Those compounds can be used alone or as mixtures of two or more thereof.

The comonomer used is preferably a monomer mixture comprising an alkyl acrylate as the main component, and more preferably a monomer mixture comprising the alkyl acrylate as the main component, an alkyl methacrylate, and a styrene.

Examples of the radically polymerizable group bonded to one end of the polymer skeleton include (meth)acryloyl group and (meth)allylic group.

The macromonomer used in the present invention has a number average molecular weight of preferably 1,000 to 30,000, and more preferably 1,000 to 5,000. The term "number average molecular weight" used herein means a number average molecular weight in terms of polystyrene standards measured by a gel permeation chromatography.

If the number average molecular weight is less than 1,000, either of workability or hardness of the coating film after treatment with a pressurized steam is liable to deteriorate, and on the other hand, if the number average molecular weight exceeds 30,000, the macromonomer is liable to remain as an unreacted polymer, decreasing physical properties of the coating film.

The average molecular weight of the macromonomer can easily be controlled by changing the amounts of chain transfer agent and polymerization initiator used in a synthesis of the polymer skeleton of the macromonomer.

The proportion of the N-alkoxymethyl (meth)acrylamide monomer unit in the polymer skeleton of the macromonomer is preferably 3 to 40% by weight, more preferably 5 to 30% by weight, and most preferably 5 to 15% by weight, based on the total weight of the components (a) to (d). If the proportion of the N-alkoxymethyl (meth)acrylamide is less than 3% by weight, water resistance and pencil hardness in hot water at 80° C. (hereinafter referred to as a "pencil hardness in hot water") of the coating film formed by the aqueous resin composition obtained are liable to decrease, and on the other hand, if the proportion thereof exceeds 40% by weight, workability of the coating film is liable to decrease.

Preparation method of the macromonomer is described below.

A preferred preparation method of the macromonomer which can be used in the present invention is a method of preparing a polymer comprising N-alkoxymethyl (meth) acrylamide unit alone or N-alkoxymethyl (meth)acrylamide unit, and other α,β-ethylenically unsaturated monomer units, having a carboxyl group at one end thereof (hereinafter referred to as a "prepolymer"), and then reacting, for example, glycidyl (meth)acrylate with carboxyl groups in the prepolymer to introduce a radically polymerizable group such as (meth)acryloyl group into one end of the prepolymer.

The prepolymer can also be prepared by the following method.

N-alkoxymethyl (meth)acrylamide alone or a mixture of N-alkoxymethyl (meth)acrylamide and other radically polymerizable monomer is radically polymerized in the following solvent in the presence of a mercaptan chain transfer agent having a carboxyl group.

The average molecular weight of the prepolymer is not identical with that of the macromonomer in a severe sense, but it is preferred to prepare a prepolymer having same number average molecular weight of 1,000 to 30,000 as in the macromonomer.

Examples of the solvent used in the radical polymerization include toluene, xylene, methyl ethyl ketone, methyl isobutyl ketone, ethyl acetate, butyl acetate, methanol, ethanol, isopropyl alcohol, butanol, ethylene glycol monomethyl ether, ethylene glycol monobutyl ether, diethylene glycol monobutyl ether, propylene glycol monomethyl ether, propylene glycol monobutyl ether, butyl carbitol and butyl cellosolve. Those solvents can be used alone or as mixtures of two or more thereof.

Examples of the mercaptan chain transfer agent containing a carboxyl group which can be used include mercaptoacetic acid, 2-mercaptopropionic acid, 3-mercaptopropionic acid and p-mercaptobenzoic acid. The chain transfer agent is used in an amount of preferably 0.3 to 20% by weight based on the total weight of all the monomers used in the polymerization.

The polymerization initiator preferably is a radical generation type polymerization initiator such as an azo compound or a peroxide. Of those, the azo compound is more preferred in the point of less amount of by-products. Examples of the azo compound include 2,2-azobisisobutyronitrile, 2,2-azobis-(2-methylbutyronitrile), 1-azobis-(1-cyclohexanecarbo-nitrile) and 1-azobis-(4-cyanovaleric acid) (hereinafter referred to as "ACVA"). Of the above polymerization initiators, ACVA has a carboxyl group in the molecule. Therefore, when AVCA is used, even if the chain transfer agent is not used, a prepolymer having a carboxyl -group at one end thereof is obtained, similar to the use of a peroxide.

The amount of the polymerization initiator used is preferably 0.05 to 0.8% by weight based on the total weight of the monomers used where the chain transfer agent is used, and 1 to 20% by weight based on the weight of the total weight of monomers used where the chain transfer agent is not used.

In order to introduce a radically polymerizable group into the prepolymer obtained by the above method, the prepolymer is reacted with, for example, a glycidyl group-containing monomer. Example of the glycidyl group-containing monomer include glycidyl (meth)acrylate, allylglycidyl ether, N-[4-(2,3-epoxy-propoxy)-3,5-dimethylbenzyl]acrylamide and methylglycidyl methacrylate.

The amount of the glycidyl group-containing monomer used is preferably 0.8 to 1.5 moles per mole of the prepolymer. If the amount of glycidyl group-containing monomer used is less than 0.8 mole per mole of the prepolymer, the conversion of from the prepolymer to the macromonomer is poor, and on the other hand, if the amount of the glycidyl group-containing monomer used exceeds 1.5 moles per mole of the prepolymer, a large amount of the glycidyl group-containing monomer remains in the macromonomer.

The reaction of the prepolymer with the glycidyl group-containing monomer is preferably conducted at room temperature to 120° C. in an organic solvent in the presence of an appropriate catalyst. The same solvent as used in the polymerization for obtaining the prepolymer can also be used as the solvent used in this reaction. Examples of the catalyst used include N,N-dimethylaniline, triethylamine, tetrabutylammonium bromide, tetraethylammonim chloride, tetrabutylphosphonium bromide and triphenylbutylphosphonium bromide.

In order to prevent polymerization of polymerizable components in the reaction solution, it is preferred to use a radical polymerization inhibitor such as hydroquinone, hydroquinone monomethyl ether or phenothiazine in an amount of 0.5 to 2.5% by weight based on the weight of the glycidyl group-containing monomer.

The proportion of the unit based on the component (a), i.e., macromonomer, is 3 to 30% by weight, and preferably 5 to 20% by weight, based on the total weight of the units based on the components (a) to (d). If the proportion of the component (a) unit is less than 3% by weight, the coating film formed from the aqueous resin composition does not have excellent workability and hardness in hot water in combination. On the other hand, if the proportion of the component (a) unit is exceeds 30% by weight, such a copolymer has poor workability.

Examples of the α,β-ethylenically unsaturated carboxylic acid as the component (b) include acrylic acid, methacrylic acid, crotonic acid, maleic acid, maleic anhydride, fumaric acid and itaconic acid. Of those, acrylic acid and methacrylic acid are preferred. Those compounds can be used alone or as mixtures of two or more thereof The proportion of the component (b) monomer unit in the unneutralized graft copolymer is 3 to 20% by weight based on the total weight of the units based on the components (a) to (d). If the proportion of the component (b) monomer unit is less than 3% by weight, it is difficult to make the unneutralized graft copolymer water-soluble, and on the other hand, if the proportion thereof exceeds 20% by weight, the coating film formed from the aqueous resin composition obtained has poor water resistance.

Examples of the hydroxyalkyl (meth)acrylate as the component (c) include hydroxyethyl (meth)acrylate, 2-hydroxypropyl (meth)acrylate, hydroxypropyl (meth) acrylate and hydroxybutyl (meth)acrylate. Those compounds can be used alone or as mixtures of two or more thereof.

The proportion of the component (c) monomer unit in the unneutralized graft copolymer is 5 to 40% by weight, and preferably 10 to 30% by weight, based on the total weight of units based on the components (a) to (d). If the proportion of the component (c) monomer unit is less than 5% by weight, crosslinking reaction is insufficient, resulting in poor mechanical strength of the coating film, and on the other hand, if the proportion thereof exceeds 40% by weight, the coating film has poor water resistance and workability.

Examples of the other α,β-ethylenically unsaturated monomers as the component (d) which are preferably used include alkyl (meth)acrylates such as methyl (meth)acrylate, ethyl (meth)acrylate, 2-ethylhexyl (meth)acrylate, butyl (meth)acrylate or cyclohexyl (meth)acrylate; and aromatic vinyl monomers such as styrene or a-methylstyrene. N-alkoxymethyl (meth)acrylamides such as N-methoxymethyl (meth)acrylamide or N-(n-butoxy)methyl (meth)acrylamide can also be used.

If N-alkoxymethyl (meth)acrylamide is used as part of the component (d), the copolymer obtained has a structure of having N-alkoxymethyl (meth)acrylamide monomer unit at both branch and backbone, so that crosslinking curability is further increased, and an aqueous resin composition comprising such a copolymer has excellent baking property at low temperature.

The proportion of the component (d) monomer unit is a proportion obtained by substracting the proportion of the units based on the components (a), (b) and (c) from the total weight, 100% by weight, of the structural units of the unneutralized graft copolymer, and is 10 to 89% by weight, and preferably 30 to 70% by weight, based on the total weight of the units based on the components (a) to (d).

Where N-alkoxymethyl (meth)acrylamide is used as part of the component (d), the amount thereof is preferably 3 to 30% by weight based on the total weight of the components (a) to (d).

The polymerizable components (a) to (d) can be polymerized, with each component having substantially 100% conversion, by the conventional polymerization method such-as polymerization methods described in the Examples hereinafter. Therefore, in order to obtain the copolymer having the structure as described above, the components (a) to (d) are subjected to polymerization in each proportion corresponding to the structure.

Preparation method of the unneutralized graft copolymer is briefly described below.

The polymerizable components are radically polymerized at a temperature of 60 to 150° C. in the presence of a radical polymerization initiator such as azobisisobutyronitrile using a polymerization solvent. Example of the polymerization solvent which can be used include isopropyl alcohol, n-butanol, isobutyl alcohol, ethylene glycol monomethyl ether and ethylene glycol monoethyl ether.

In the above polymerization, the molecular weight of the copolymer obtained can be controlled by using an appropriate amount of a chain transfer agent such as n-dodecyl mercaptan, mercaptoacetic acid, thiomalic acid, mercaptoethanol or mercaptopropionic acid.

The unneutralized graft copolymer obtained has a number average molecular weight of preferably 2,000 to 20,000, and more preferably 3,000 to 15,000.

Carboxyl groups in the unneutralized graft copolymer are neutralized with a base to obtain an aqueous copolymer. In this neutralization, all of the carboxyl-groups in the copolymer may be neutralized, but if required and necessary, part of carboxyl groups may be neutralized.

A neutralization method by adding an aqueous solution of a base to an organic solvent solution of the copolymer obtained is simple and easy as the practical neutralization method.

Examples of the base which can be used include organic amines such as monoethanol amine, dimethylamine, diethylamine, triethylamine, triethanol amine, diethylethanol amine or dimethylethanol amine, and ammonia. Those compounds can be used alone or as mixtures of two or more thereof.

The organic solvent used as the polymerization solvent is distilled off from the aqueous copolymer solution obtained by the above method under reduced pressure, and water is then added thereto, thereby obtaining a copolymer aqueous solution or aqueous dispersion, having a solid concentration of 20 to 70% by weight, which is suitable for coating a metal.

Examples of the amino resin which can be used in combination with the aqueous copolymer include alkyl etherified melamines such as methyl etherified melamine or butyl etherified melamine; alkyl etherified urea resins; and alkyl etherified benzoguanamines such as methyl etherified benzoguanamine or ethyl etherified benzoguanamine. Those compounds can be used alone or as mixtures of two or more thereof.

The amino resin is preferably selected according to the purpose of use of the aqueous resin composition. For the use which requires high water resistance, such as metal cans for beverage and packing foods, an alkyl etherified benzoguanamine is suitable, and for the use in the field of automobiles, requiring weathering resistance, an alkyl etherified melamine is suitable.

The alkyl etherified melamines, alkyl etherified urea resins and alkyl etherified benzoguamanines can be used in the form of a polymer such as a dimer, a trimer, etc., in addition to the form of a monomer. Further, the amino resin can have any degree of alkyl etherification, and amino resins wherein all or part of active hydrogen atoms in amino groups are substituted with alkyl ether groups can all be used. The amino resin is used in an amount of preferably 10 to 80 parts by weight, in terms of an amino resin solid component, per 100 parts by weight of the solid component in the aqueous copolymer.

The aqueous copolymer has a good compatibility with the amino resin, so that a uniform aqueous resin composition can be obtained in the present invention.

The aqueous copolymer used in the present invention contains self-crosslinkable N-alkoxymethyl (meth) acrylamide units. Therefore, if the content of the units is increased, the aqueous copolymer itself can form a cured coating film without using the amino resin together.

The aqueous resin composition for coating a metal according to the present invention may further contain various additives for paint in addition to the aqueous copolymer and the amino resin. One example of the additives is a film-forming agent such as ethylene glycol monobutyl ether.

A resin composition obtained by mixing an aqueous solution or an aqueous dispersion of the aqueous copolymer with the amino resin in the proportion described above is coated on a metal substrate such as aluminum plates or zinc treated steel plates, various treated steel plates or tinplate, and then heat cured at 150 to 220° C. for 3 to 20 minutes to form a cured coating film.

The aqueous resin composition of the present invention can directly be coated on the surface of a metal, but may be applied to the surface of a metal, coated with an ink or a primer.

The aqueous resin composition is suitably applied to metal cans.

The present invention is described in more detail by reference to the following examples, but it should be understood that the invention is not construed as being limited thereto. Unless otherwise indicated, all percents, parts, ratios and the like are by weight.

PRODUCTION EXAMPLE 1
Preparation of Macronomomer M-1

A mixed solution of 93.0 g of ethyl acrylate (hereinafter referred to as "EA") and 7.0 g of N-methoxymethyl acrylamide (hereinafter referred to as "NMMA") was prepared. 10% by weight of the monomer mixed solution prepared above and 56.0 g of toluene were charged in a glass flask equipped with s stirrer, two dropping funnels, a gas introducing pipe and a thermometer, and the temperature of the flask was raised to 90° C.

A mixed solution of the remaining 90% of the mixed monomer solution prepared above, 2.21 g of mercaptopropionic acid as a chain transfer agent and 16.0 g of toluene was added dropwise to the flask from one dropping funnel over 4 hours. Simultaneously 0.02 g of azobisisobutyronitrile dissolved in 12.0 g of toluene was added dropwise to the flask over 3 hours, and 0.04 g of azobisisobutyronitrile dissolved in 16.0 g of toluene was then added dropwise to the flask over 2 hours, from another dropping funnel.

The resulting mixture was stirred for 1 hour to obtain a polymer having a carboxyl group derived from mercaptopropionic acid at one end of the molecule.

0.04 g of methoxybenzophenone as a polymerization inihibitor, 1.00 g of tetrabutylammonium bromide as a catalyst and 3.55 g of glycidyl methacrylate were added to a solution of the polymer obtained above, and addition reaction of carboxyl groups in the polymer and glycidyl group of glycidyl methacrylate was conducted at 93° C. for 6 hours while blowing air.

As a result, a macromonomer having an end group purity of methacyloyl group of 99.8% based on the degree of decrease of an acid value of the polymer was obtained (Macromonomer M-1). Macromonomer M-1 had a number average molecular weight of 4,100 in terms of polystyrene standards by gel permeation chromatography.

PRODUCTION EXAMPLE 2
Preparation of Aqueous Graft Copolymer A

Using a mixture of monomers shown below, copolymerization was conducted in the following method.

| | |
|---|---|
| Macromonomer M-1 | 25.0 g |
| Styrene (St) | 24.4 g |
| EA | 18.1 g |
| n-Butyl acrylate (nBA) | 15.2 g |
| Acrylic acid (AA) | 6.7 g |
| 2-Hydroxyethyl methacrylate (HEMA) | 10.6 g |

One third of the above mixed liquid, 0.38 g of mercaptoethanol, 18.0 g of ethylene glycol monobutyl ether and 42.0 g of isopropyl alcohol were charged in a glass flask equipped with a stirrer, a reflux condenser, two dropping funnel, a gas introducing pipe and a thermometer, and the temperature of the flask was raised to 87° C.

The remaining two third of the monomer mixed liquid and 0.38 g of mercaptoethanol were added dropwise to the flask over 3 hours from one dropping funnel. Simultaneously a polymerization initiator solution composed of 6.0 g of ethylene glycol monobutyl ether, 14.0 g of isopropyl alcohol and 0.2 g of 2,2'-azobis(2-methyl-butyronitrile) (herein after referred to as "ABN-E") was added dropwise to the flask over 3 hours from another dropping funnel.

6.0 g of ethylene glycol monobutyl ether, 14.0 g of isopropyl alcohol and 0.46 g of ABN-E were then added dropwise to the flask over 2 hours. The resulting mixture was stirred for 2 hours to prepare a graft copolymer. The graft copolymer thus prepared had a number average molecular weight of 8,600.

The thus obtained graft copolymer solution was heated to 40° C., and isopropyl alcohol was distilled off under reduced pressure. 7.2 g of dimethyl ethanol amine and 70 g of distilled water were added to neutralize the solution, thereby obtaining an aqueous liquid of a graft copolymer A containing 50% by weight of a solid content and 15% by weight of ethylene glycol monobutyl ether.

COMPARATIVE PRODUCTION EXAMPLE 1

Preparation of Aqueous Copolymer R-1

A linear random copolymer comprising the same monomer units as in the graft copolymer A was prepared in the same manner as in Production Example 2.

Monomers used in the polymerization were the following monomer mixture.

| | |
|---|---|
| St | 24.4 g |
| EA | 41.3 g |
| nBA | 15.2 g |
| NMMA | 1.8 g |
| AA | 6.7 g |
| HEMA | 10.6 g |

The copolymer obtained was neutralized, and part of the solvent was replaced with water, thereby obtaining an aqueous copolymer R-1.

PRODUCTION EXAMPLE 3

Preparation of Aqueous Graft Copolymer B

Polymerization was conducted using the following monomer mixture, and the polymer obtained was neutralized in the same manner as in Production Example 2 to obtain an aqueous copolymer B.

| | |
|---|---|
| Macromonomer M-1 | 25.0 g |
| St | 26.1 g |
| nBA | 27.8 g |
| NMMA | 3.8 g |
| AA | 6.7 g |
| HEMA | 10.6 g |

COMPARATIVE PRODUCTION EXAMPLE 2

Preparation of Aqueous Copolymer R-2

A linear random copolymer comprising the same monomer units as in the graft copolymer B was neutralized to obtain an aqueous copolymer R-2.

Monomers used in the polymerization were the following monomer mixture.

| | |
|---|---|
| St | 26.1 g |
| EA | 23.3 g |
| nBA | 27.8 g |
| NMMA | 5.5 g |
| AA | 6.7 g |
| HEMA | 10.6 g |

The copolymer obtained was neutralized, and part of the solvent was replaced with water, thereby obtaining an aqueous copolymer R-1.

COMPARATIVE PRODUCTION EXAMPLE 3

Preparation of Aqueous Copolymer R-3

Production Example 1 was followed except that HEMA was used in place of NMMA to obtain a macromonomer M-2 (number average molecular weight : 5,100) having an end group purity of methacryloyl group of 98.5%.

The following monomer mixture was polymerized to obtain a graft copolymer composed of the same monomer units as in the graft copolymer B. Neutralization was conducted in the same manner as in Production Example 2 to obtain an aqueous graft copolymer R-3.

| | |
|---|---|
| Macromonomer M-2 | 25.0 g |
| St | 28.0 g |
| nBA | 27.8 g |
| NMMA | 3.8 g |
| AA | 6.7 g |
| HEMA | 10.6 g |

PRODUCTION EXAMPLE 4

Preparation of Macromer M-3

29.0 g of methyl methacrylate, 1.0 g of NMMA, 2.7 g of mercaptopropionic acid and 30.0 g of toluene were charged in a glass flask equipped with s stirrer, two dropping funnels, a gas introducing pipe and a thermometer, and the temperature of the flask was raised to 90° C.

A mixed liquid of 64.0 g of methyl methacrylate, 6.0 g of NMMA and 22.5 g of toluene was added dropwise to the flask from one dropping funnel over 3 hours. Simultaneously 0.15 g of azobisisobutyronitrile dissolved in 7.5 g of toluene was added dropwise to the flask over 3 hours, and 0.6 g of azobisisobutyronitrile dissolved in 30.0 g of toluene was then added dropwise to the flask over 2 hours, from another dropping funnel.

The resulting mixture was stirred for 2 hour to obtain a prepolymer solution having a carboxyl group at the end.

0.05 g of hydroquinone monomethyl ether, 1.2 g of tetrabutylammonium bromide as a catalyst and 3.95 g of glycidyl methacrylate were added to the prepolymer solution obtained above, and reaction was conducted at 93° C. for 6 hours while blowing air.

As a result, a macromonomer having an end group purity of methacyloyl group of 99.8% based on the degree of decrease of an acid value of the prepolymer was obtained (Macromonomer M-3). Macromonomer M-3 had a number average molecular weight of 5,100 in terms of polystyrene standards by gel permeation chromatography.

The macromonomer thus obtained was reprecipitated for purification, and the purified macromonomer was measured for infrared absorption spectrum and proton nulear reasonace spectrum. The results obtained are shown in FIGS. 1 and 2, respectively.

Figure 2:
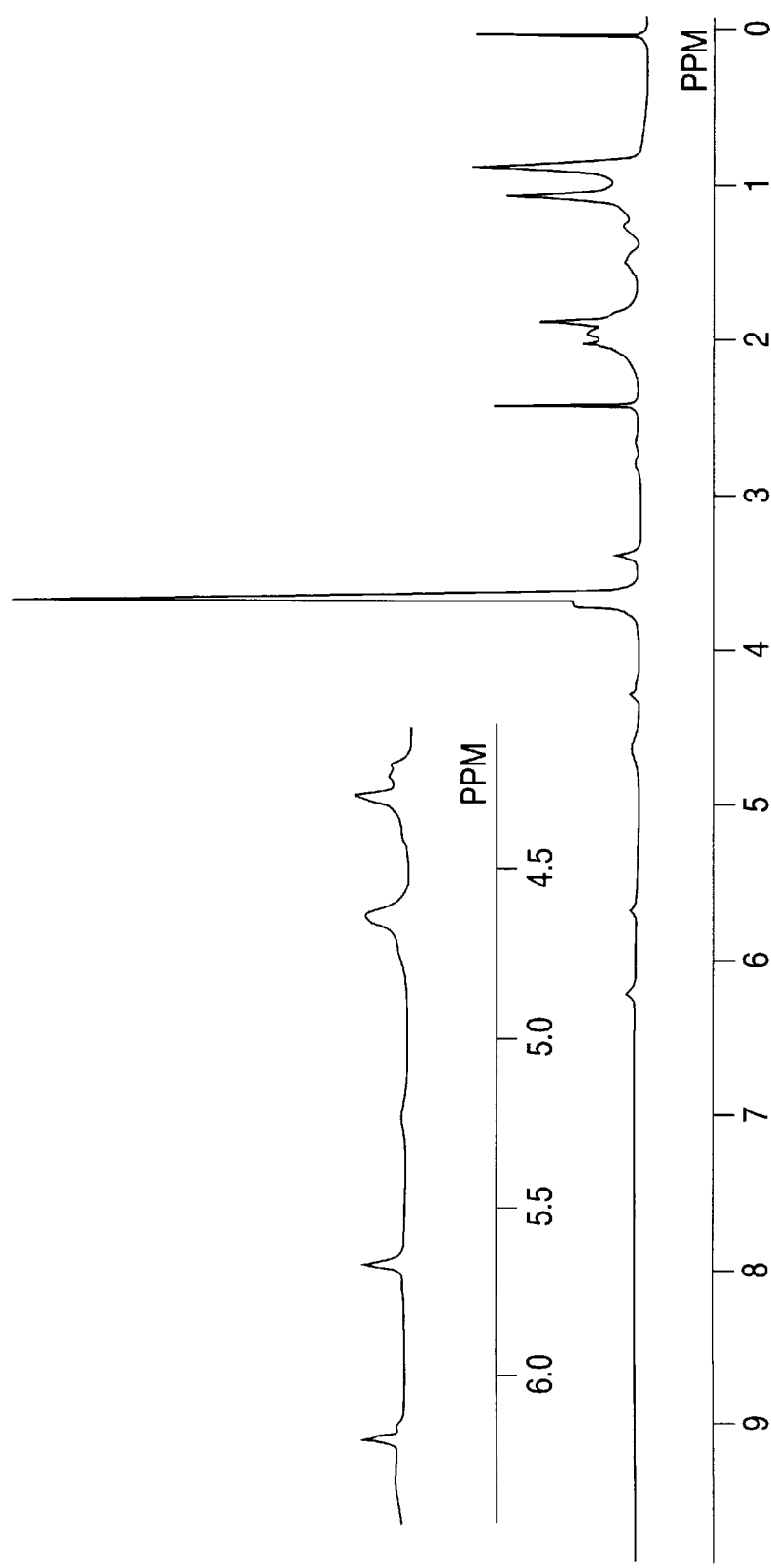
FIG. 2 shows a proton nuclear magnetic resonance spectrum of the macromonomer obtained in Production Example 4, with the region of 4.5 to 6.0 PPM being shown in an enlarged view.

Signals at 5.7 PPM and 6.2 PPM in FIG. 2 are due to hydrogen atom in methacryloyl group present in the polymer.

PRODUCTION EXAMPLE 5

Preparation of Macromonomer M-4

A mixed liquid of 90.0 g of ethyl acrylate and 10.0 g of NMMA was prepared. 10% of the mixed liquid obtained above and 56.0 g of toluene were charged in a glass flask equipped with a stirrer, two dropping funnels, a gas introducing pipe and a thermometer, and the temperature of the flask was raised to 90° C.

A mixed solution of the remaining 90% of the mixed liquid and 2.21 g of mercaptopropionic acid was added dropwise to the flask over 4 hours from one dropping funnel. Simultaneously 0.02 g of azobisisobutyronitrile dissolved in 12.0 g of toluene was added dropwise to the flsk over 3 hours, and 0.04 g of azobisisobutyronitrile in a form of a toluene solution was added dropwise to the flask over 2 hours, from another dropping funnel.

The resulting mixture was stirred for 1 hour to obtain a polymer having carboxyl group at the end.

0.04 g of hydroquinone monomethyl ether, 1.00 g of tetrabutylammonium bromide and 3.55 g of glycidyl methacrylate were added to a solution of the polymer having the carboxyl end group. Reaction was conducted at 93° C. for 6 hours while blowing air.

A macromonomer M-4 (number average molecular weight: 4,100) having an end group purity of 99.8% based on the degree of decrease of an acid value of the polymer was obtained.

EXAMPLES 1 AND 2

65 Parts of MYCOAT 106 (dimethylimino type benzoguanamine, a product of Mitsui Cyanamid Co.) as an amino resin were mixed with 100 parts of the aqueous copolymer A obtained in Production Example 2 (Example 1) or the aqueous copolymer B obtained in Production Example 3 (Example 2), in terms of the solid content.

A silicone leveling agent, ethylene glycol monobutyl ether and water were added to the resulting mixture to obtain an aqueous resin composition having an organic solvent content of 25% by weight and a solid content of 35% by weight.

The aqueous resin composition obtained above was coated on an aluminum plate with a bar coater at a dry thickness of 5– 6 μm, and the coating was cured under heating at 200° C. for 10 minutes.

On the cured film obtained above and the film after a pressurized steam treatment (allowing to stand in steam at 130° C. for 30 minutes) by a pressure cooker device, the following physical properties were measured by the methods defined in JIS K5400.

a. Impact Resistance du Pont type impact test (point of impact: ½ inch, load: 500 g)

b. Water Resistance

Method according to boiling water resistance test (immersion time: 60 minutes)

c. Adhesion

Method according to a cross hatch tape test (evaluated by percentage of film remained after peeling a tape)

d. Hardness

Method according to a pencil scratch hardness (hardness in hot water is manual work)

The results obtained are shown in the Table below.

COMPARATIVE EXAMPLES 1 TO 3

Example 1 was followed except that each of the aqueous copolymer R-1, R-2 and R-3 obtained in Comparative Production Examples 1 to 3, respectively, was used in place of the aqueous copolymer A to obtain an aqueous resin composition.

Physical properties of the film obtained from the respective aqueous resin composition were measured in the same manners as in Examples 1 and 2.

The results obtained are shown in the Table below.

TABLE

|  | Ex 1 | Ex 2 | C. Ex 1 | C. Ex 2 | C. Ex 3 |
| --- | --- | --- | --- | --- | --- |
| Aqueous copolymer | A | B | R-1 | R-2 | R-3 |
| Before pressurized steam treatment | | | | | |
| Impact resistance (cm) | 50 | 50 | 20 | 20 | 35 |
| Water resistance | Pass | Pass | Pass | Pass | Pass |
| Adhesion (%) | 100 | 100 | 100 | 100 | 100 |
| Hardness | 3H | 3H | 3H | 3H | 3H |
| Hardness in hot water | H | 2H | F | H | H |
| After pressurized steam treatment | | | | | |
| Impact resistance (cm) | 50 | 50 | 5 | 0 | 30 |
| Adhesion (%) | 100 | 100 | 100 | 100 | 100 |
| Hardness | H | 2H | F | H | H |
| Hardness in hot water | HB | F | B | F | 3B |

In the above Table:
Ex: Example
C. EX: Comparative example

It can be understood from the comparison between Example 1 and Comparative Example 1, and also the comparison between Example 2 and Comparative Example 2 that the coating composition comprising a graft copolymer according to the present invention has excellent impact resistance before pressurized steam treatment, and also excellent impact resistance and hardness after the steam treatment, as compared with the coating composition comprising the linear random copolymer.

Further, in Comparative Example 3 using the aqueous graft copolymer R-3 having a copolymer of EA (93% by weight) and HEMA (7% by weight) as a branched polymer, a coating film having excellent physical properties is obtained as compared with Comparative Example 1 or Comparative Example 1, but the coating films obtained in Examples 1 and 2 have further improved impact resistance and hardness in hot water after the pressurized steam treatment, as compared with the coating film of Comparative Example 3.

According to the aqueous resin composition for coating a metal of the present invention, due to the properties of the aqueous copolymer used as the main component thereof, a coating film having excellent hardness, water resistance, workability and gloss can be formed on a metal substrate. In particular, a coating film having excellent hardness in hot water after the pressurized steam treatment can be obtained, and this is the technical result which could not have conventionally been obtained by the prior art.

While the invention has been described in detail and with reference to specific embodiments thereof, it will be apparent to one skilled in the art that various changes and modifications can be made therein without departing from the spirit and scope thereof.

What is claimed is:

1. An aqueous resin composition for coating a metal, which comprises
    (A) an aqueous copolymer obtained by neutralizing with a base carboxyl groups in a copolymer which is obtained by copolymerizing
        (a) 3 to 30% by weight of a macromonomer which is a copolymer of an N-alkoxymethyl (meth)acrylamide monomer unit and other α,β-ethylenically unsaturated monomer unit, having a radically polymerizable group at one end thereof;
(b) 3 to 20% by weight of an α,β-ethylenically unsaturated carboxylic acid;
(c) 5 to 40% by weight of a hydroxyalkyl (meth) acrylate; and
(d) 10 to 89% by weight of other α,β-ethylenically unsaturated monomers, the amount of the components (a) to (d) being based on the total weight of the components (a) to (d), and (B) an amino resin.

2. The composition as claimed in claim 1, wherein the macromonomer (a) has a number average molecular weight of 1,000 to 30,000.

3. The composition as claimed in claim 1, wherein the macromonomer (a) contains N-alkoxymethyl (meth) acrylamide monomer units in an amount of 3 to 40% by weight.

4. The composition as claimed in claim 1, wherein the α,β-ethylenically unsaturated-carboxylic acid (b) is selected from the group consisting of acrylic acid, methacrylic acid, crotonic acid, maleic acid, fumaric acid and itaconic acid.

5. The composition as claimed in claim 1, wherein the hydroxyalkyl (meth)acrylate (c) is selected from the group consisting of hydroxyethyl (meth)acrylate, hydroxypropyl (meth)acrylate and hydroxybutyl (meth)acrylate.

6. The composition as claimed in claim 1, wherein said metal is metal cans.

* * * * *